United States Patent
Jagoda

(10) Patent No.: US 11,598,448 B2
(45) Date of Patent: Mar. 7, 2023

(54) SYSTEM AND METHOD FOR DETECTING VALVE OPERATING CONDITIONS

(71) Applicant: DANFOSS POWER SOLUTIONS II TECHNOLOGY A/S, Nordborg (DK)

(72) Inventor: Aaron Hertzel Jagoda, Bloomington, MN (US)

(73) Assignee: Danfoss Power Solutions II Technology A/S, Nordborg (DK)

(*) Notice: Subject to any disclaimer, the term of this patent is extended or adjusted under 35 U.S.C. 154(b) by 372 days.

(21) Appl. No.: 16/906,172

(22) Filed: Jun. 19, 2020

(65) Prior Publication Data

US 2020/0393062 A1  Dec. 17, 2020

Related U.S. Application Data

(63) Continuation of application No. 16/453,518, filed on Jun. 26, 2019, now Pat. No. 10,718,447.

(Continued)

(51) Int. Cl.
*F16K 31/00*  (2006.01)
*E02F 9/20*  (2006.01)
*F16K 37/00*  (2006.01)
*E02F 9/22*  (2006.01)
*F15B 13/08*  (2006.01)

(Continued)

(52) U.S. Cl.
CPC ........ *F16K 37/0041* (2013.01); *E02F 9/2004* (2013.01); *E02F 9/2225* (2013.01); *E02F 9/2267* (2013.01); *F15B 13/043* (2013.01); *F15B 13/08* (2013.01); *F16K 31/06* (2013.01); *F16K 31/0613* (2013.01); *F16K 31/0655* (2013.01); *G01H 11/06* (2013.01);

(Continued)

(58) Field of Classification Search
None
See application file for complete search history.

(56) References Cited

U.S. PATENT DOCUMENTS 3,741,584 A  6/1973  Arai
6,571,757 B1  6/2003  Simpson
(Continued)

FOREIGN PATENT DOCUMENTS

GB   2248910 A   4/1992

OTHER PUBLICATIONS

Extended European Search Report for Application No. 19183744.2 dated Nov. 25, 2019.

*Primary Examiner* — Kelsey E Cary
(74) *Attorney, Agent, or Firm* — Merchant & Gould P.C.

(57) ABSTRACT

The present disclosure relates to a valve assembly including a valve moveable between an open position where hydraulic fluid flow is permitted between first and second ports of the valve and a closed position where hydraulic fluid flow is blocked between the first and second ports. A characteristic vibration is generated by turbulent hydraulic fluid flow within the valve when hydraulic fluid flow is first initiated between the first and second ports as the valve moves from the closed position toward the open position. The valve assembly also includes a controller for providing electrical current to control movement of the valve via a solenoid. The controller includes an accelerometer for sensing the characteristic vibration. The controller identifies an electrical current value of the electrical current at a time when the characteristic vibration is detected.

20 Claims, 6 Drawing Sheets

Related U.S. Application Data

(60) Provisional application No. 62/692,173, filed on Jun. 29, 2018.

(51) Int. Cl.
*F16K 31/06* (2006.01)
*G01H 11/06* (2006.01)
*F15B 13/043* (2006.01)
*F15B 11/16* (2006.01)

(52) U.S. Cl.
CPC ......... *F15B 11/16* (2013.01); *F15B 2211/426* (2013.01); *F15B 2211/6346* (2013.01); *F15B 2211/71* (2013.01)

(56) References Cited

U.S. PATENT DOCUMENTS

| | | |
|---|---|---|
| 8,322,329 B1 | 12/2012 | Sikes |
| 8,651,096 B2 | 2/2014 | Sikes |
| 8,898,036 B2 | 11/2014 | Sittler et al. |
| 10,316,929 B2 | 6/2019 | Wang et al. |
| 10,323,663 B2 | 6/2019 | Wang et al. |
| 2008/0042087 A1 | 2/2008 | Pfaff |
| 2009/0283942 A1 | 11/2009 | Nakamura |
| 2013/0305825 A1 | 11/2013 | Comparetto et al. |
| 2017/0138151 A1* | 5/2017 | Reyes, III ............... E21B 33/06 |
| 2018/0016861 A1* | 1/2018 | Carrillo ............... F16K 11/0712 |

\* cited by examiner

SYSTEM AND METHOD FOR DETECTING VALVE OPERATING CONDITIONS

CROSS-REFERENCE TO RELATED APPLICATION

This application is a continuation of U.S. patent application Ser. No. 16/453,518 filed Jun. 26, 2019, which claims the benefit of U.S. Patent Application Ser. No. 62/692,173, filed on Jun. 29, 2018, the disclosures of which are incorporated herein by reference in their entireties.

BACKGROUND

Hydraulic systems include valves. The valves are often spool or poppet style valves, and are controlled by an operator. The operator, using a joystick or other control interface, enters a command that causes an electromagnetic actuator, such as a solenoid, to drive movement of the valve between open and closed positions. In the case of a proportional valve, the valve can control hydraulic fluid flow rate through the valve in proportion to the magnitude of an electrical current provided to a solenoid of the valve. The valves can be used to control hydraulic fluid flow to and from hydraulic actuators such as hydraulic cylinders and hydraulic motors. For example, the valves can selectively stop and start hydraulic fluid flow to and from the hydraulic actuators to stop and start movement of the hydraulic actuators, and can selectively control the hydraulic fluid flow rates provided to and from the hydraulic actuators to control the rate of movement of the hydraulic actuators.

SUMMARY

A hydraulic spool valve has a characteristic dead band. As used herein, a "dead band" is the amount of current supplied to the valve's actuator (solenoid) which produces no fluid flow through the valve. Dead bands vary from valve to valve and from hydraulic system to hydraulic system, and depend on a number of system parameters that vary from system to system. The variability in dead bands makes it difficult for an operator to know the threshold command (provided via a joystick or other command interface) required to start and stop fluid flow as gently as possible. In addition, due to hysteresis, for a given valve the closing dead band (the amount of current needed to stop flow) is typically different from the opening dead band (the amount of current needed to start flow).

In general terms, the present disclosure is directed to systems and methods that provide for improved repeatability in command control of opening and closing dead bands of a hydraulic spool valve via an operator command interface.

According to certain aspects of the present disclosure, a valve assembly includes a valve moveable between an open position where hydraulic fluid flow is permitted between first and second ports of the valve and a closed position where hydraulic fluid flow is blocked between the first and second ports, wherein a characteristic vibration is generated by turbulent hydraulic fluid flow within the valve when hydraulic fluid flow is first initiated between the first and second ports as the valve moves from the closed position toward the open position; a solenoid for moving the valve between the open and closed positions; and a controller for providing electrical current to the solenoid to move the valve, the controller including an accelerometer for sensing the characteristic vibration, wherein the controller identifies an electrical current value of the electrical current at a time when the characteristic vibration is detected.

In some examples, the identified electrical current value is a first electrical current value and the characteristic vibration is a first characteristic vibration, a second characteristic vibration is generated by turbulent hydraulic fluid flow within valve when hydraulic fluid flow is about to be stopped (i.e., blocked) between the first and second ports as the valve moves from the open position toward the closed position, and the controller is adapted to identify a second electrical current value of the electrical current at a time when the second characteristic vibration is detected by the accelerometer, and wherein the first and second electrical current values are different from each other.

It should be appreciated that the present disclosure is not limited to spool valves used in a specific type or types of hydraulic equipment. In certain examples, the valves of the present disclosure can be incorporated in equipment such as off-highway vehicles (e.g., construction vehicles and agricultural vehicles). Examples of such vehicles can include asphalt sprayers, excavators, backhoes, concrete pump trucks, dozers, wheel loaders, tractors, cranes, harvesting equipment, telehandlers, aerial work platforms, etc. Of course, valves of the present disclosure also can be used in other types of hydraulic equipment and hydraulic systems as well.

DETAILED DESCRIPTION

Figure 1:
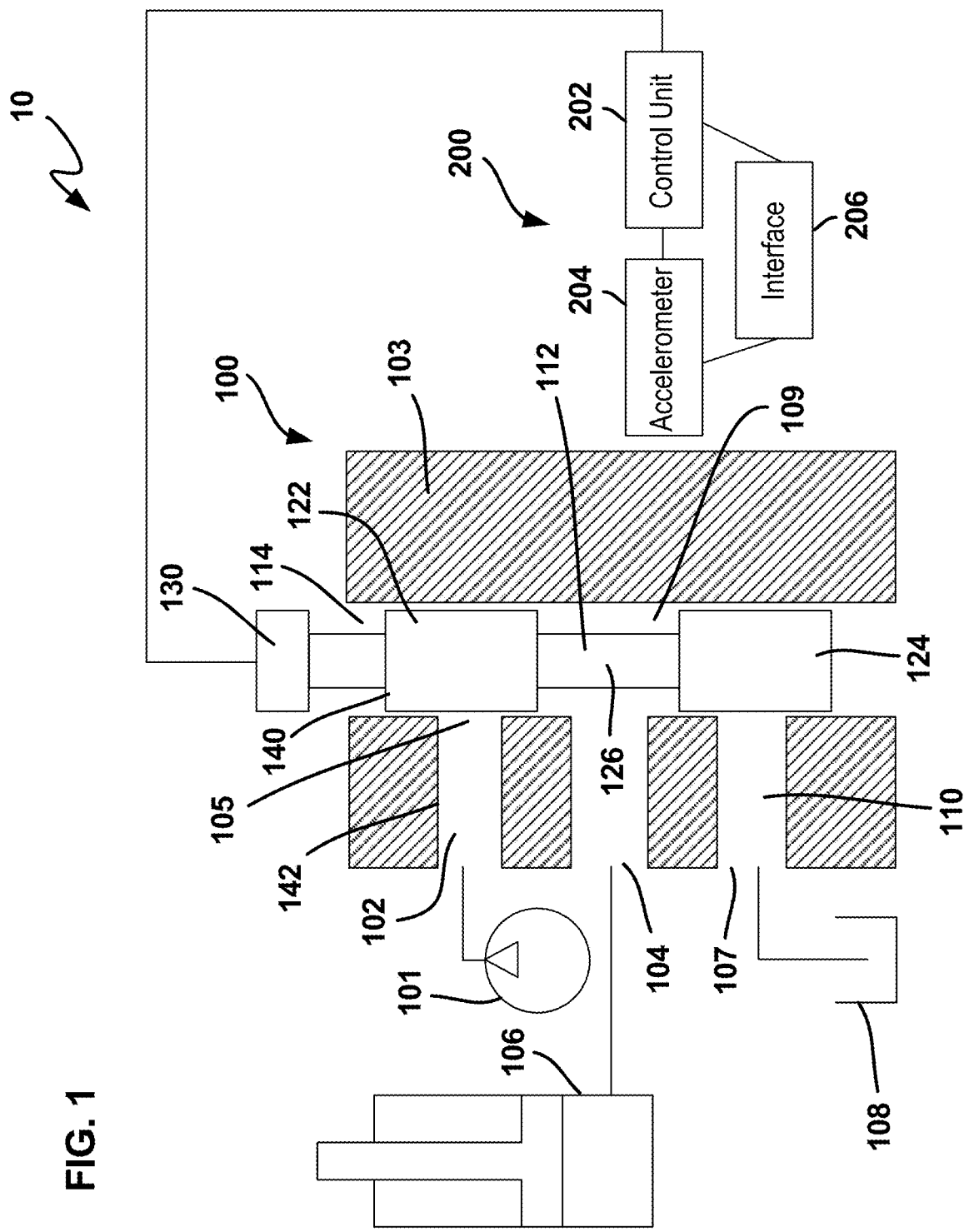
FIG. 1 is a schematic illustration of an example system including a spool valve assembly and command control according to the present disclosure.

Various embodiments will be described in detail with reference to the drawing. Reference to various embodiments does not limit the scope of the claims attached hereto. Additionally, any examples set forth in this specification are not intended to be limiting and merely set forth some of the many possible embodiments for the appended claims.

In valves such as spool valves and poppet valves, high fluid velocity causes turbulent flow when the valve flow is initiated or about to be stopped due to the relatively small port opening size under those conditions, causing a characteristic vibration that is transmitted through the housing of the valve to other components of the system. The vibration is generally not present when the valve is fully closed or when it is sufficiently opened, i.e., opened beyond a certain vibration threshold amount.

According to the present disclosure, an accelerometer, such as one used to sense orientation relative to gravity and/or motion of a hydraulic system or a component thereof, can be used to detect the acceleration corresponding to the characteristic vibration. The accelerometer can optionally include a three-dimension accelerometer. The detected vibration is then mapped to the value of electrical current being supplied to the valve actuator at the time of detection of the characteristic vibration by the accelerometer, and the identified electrical current value can then be stored, e.g., in a memory.

Due to hysteresis, the characteristic vibration associated with a valve that has just opened and a valve that is about to close can differ. The detected vibrations for each condition are therefore mapped to their own corresponding electrical current values, which can differ from each other, and both electrical current values can then be stored.

In some examples, the detected vibration from a valve that has just opened corresponds to the initial vibration detection, i.e., the vibration closest in time to the actual opening. Conversely, in some examples, the detected vibration from a valve that is closing corresponds to the last detected vibration, i.e., the vibration closest in time to the actual closing of the valve. It should be appreciated that under both the opening and closing conditions, the relevant detected vibration can be the strongest detected vibration, and can correspond to a passage size through the valve which produces the greatest amount of turbulence.

Once the two current values have been mapped, those values can then be programmed into the operating characteristics of an operator interface (e.g., joy stick, touch screen, toggle switch, dial, slide-bar or other command input interface) for repeatable command performance, i.e., such that the same command with respect to the interface (e.g., moving the joystick a certain distance) provides the same response from the valve (e.g., gently opening the valve).

Referring to FIG. 1, a hydraulic system 10 includes a three-way valve assembly 100 having a housing 103 housing a spool 112 mounted in a spool bore 114 defined by the housing 103. In this example, the spool valve is a three-way spool valve. However, the principles of the present disclosure are readily applied to other spool valves (e.g., two-way spool valves) and other flow control valves such as poppet valves. The spool 112 includes a shaft 126 coupled to a pair of lands 122 and 124 on either end of the shaft 126. A solenoid 130 is coupled to spool 112 and is adapted to drive axial movement of the spool 112 within the bore 114.

A fluid supply 101 (e.g., a pump) supplies hydraulic fluid via a supply line 102 through a supply port 105 to a work port 104. The work port 104 is connected to a hydraulic cylinder 106 that drives a load, i.e., a load of a piece of hydraulic equipment or machinery. Fluid from the work port empties to the tank 108 via a tank port 107 and tank line 110.

The hydraulic system 10 includes a control subsystem 200 (or a controller) that includes a control unit 202, an accelerometer 204 and a command interface 206. One or more of the components 202, 204, and 206 can be provided in the same unit, e.g., within the same dedicated housing. Alternatively, one or more of the components 202, 204, and 206 are not housed in the same dedicated housing but are nevertheless operably (e.g., electronically) coupled to one another. The control subsystem 200 can also include a memory and one or more processors adapted to execute computer-readable instructions stored on the memory. The memory can store, e.g., a look-up table that maps electrical current values supplied to the solenoid 130 to corresponding events, such as openings and closings of the valve.

The control unit 202 provides control signals that power the solenoid 130 by supplying the solenoid with electrical current. The control unit 202 receives inputs from the interface 206 and provides control signals to the solenoid 130 corresponding to the operating commands received via the interface 206.

The accelerometer 204 can serve multiple purposes. For example, the accelerometer 204 can detect a motion of the overall system 10 or a component of the system 10, and/or detect an orientation of the system 10 or a component thereof relative to the force of gravity. In addition, the accelerometer 204 is adapted to detect characteristic vibrations of the valve assembly 100 caused by fluid turbulence in the flow passage 109 between the ports 105 and 104.

Such turbulence occurs when one of the lands 122, 124 has just cleared a corresponding port edge, or is about to re-align with a corresponding port edge. For example, a first characteristic turbulence and vibration occur when the land edge 140 initially clears the port edge 142 (the land moving down in FIG. 1) corresponding to an opening of the valve, and a second characteristic turbulence and vibration occur when the land edge 140 is about to re-align with the port edge 142 (the land moving up in FIG. 1) corresponding to a closing of the valve. Due to hysteresis, in many systems, the current supplied to the solenoid 130 to achieve the first characteristic vibration differs from the current supplied to the solenoid 130 to achieve the second characteristic vibration.

The controller 202 processes the signals from the accelerometer 204 corresponding to the characteristic vibrations and pairs them with the corresponding current supplied, at the respective point in time, to the solenoid 130. These pairs can be stored in the memory and programmed to correspond to a particular operating command of the interface 206, such as a particular distance of a joystick away from center. Repeating the programmed command then produces the same result, the result being supply of the appropriate amount of current to the solenoid 130 of the particular valve being controlled to cause that valve to, e.g., gently open or gently close.

Figure 2:
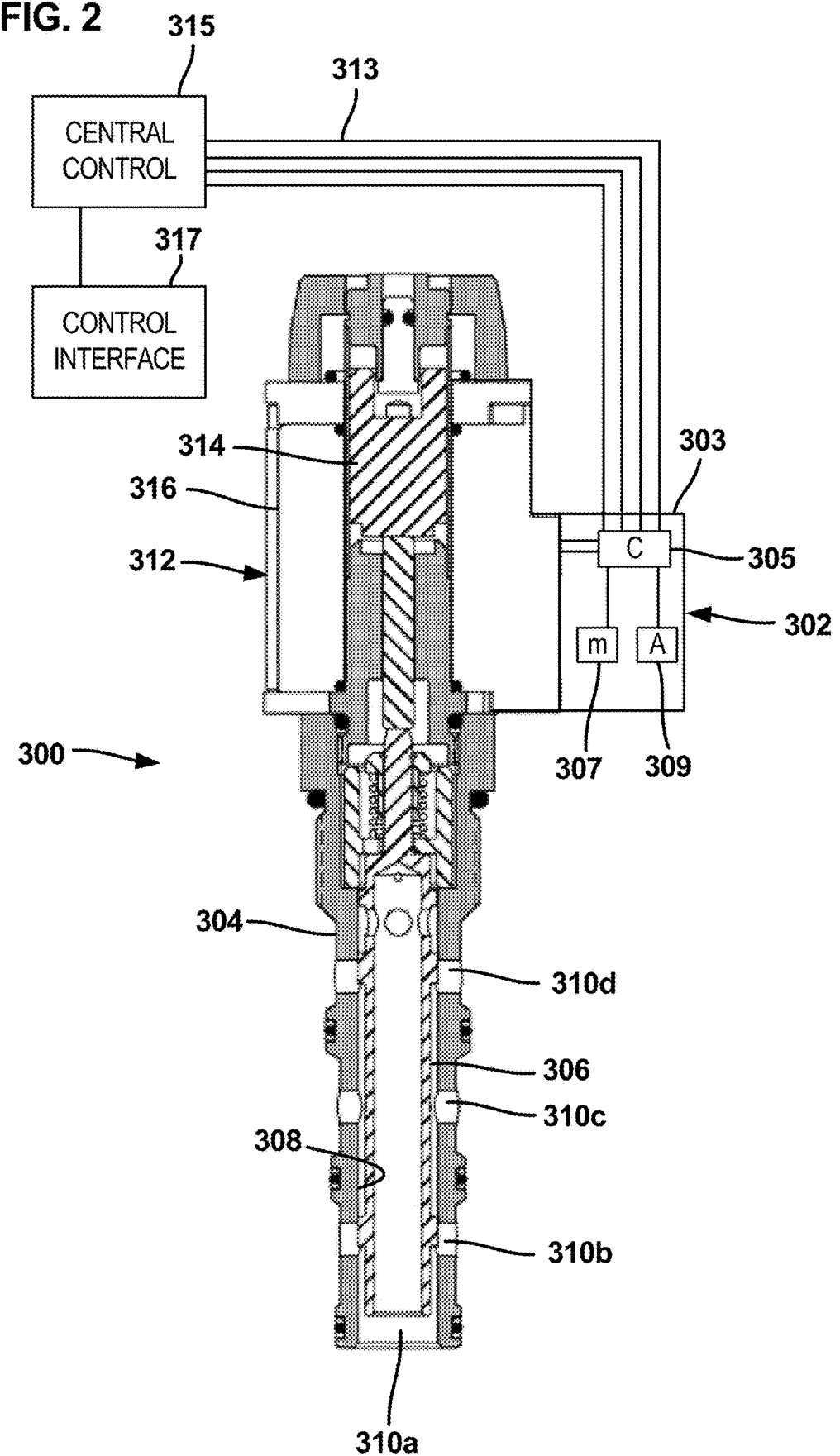
FIG. 2 depicts a proportional valve equipped with a control module in accordance with the principles of the present disclosure.

FIG. 2 depicts a proportional spool valve 300 equipped with an electronic control unit 302 in accordance with the principles of the present disclosure. The valve 300 includes a valve body 304 adapted to be installed (e.g., threaded) in the port of a valve block (e.g., a valve manifold). A spool 306 is mounted to move axially within a spool bore 308 defined by the valve body 304. By axially moving the spool 306 between different axial positions within the spool bore 308, fluid communication can be selectively opened and closed between various ports 310a-310d defined by the valve body 304. The valve 300 includes a solenoid 312 for controlling axial movement of the spool 306. The solenoid 312 includes an armature 314 positioned within a solenoid coil 316. The armature 314 moves axially a distance which is in proportion to a magnitude of electrical current passed through the solenoid coil 316. Thus, the position of the armature 314 can be changed by varying the electrical current passed through the solenoid coil 316. The armature 314 is operatively coupled to the spool 306 such that the spool 306 moves axially with the armature 314. The valve flow passage size defined between ports and thus the flow rate though the valve between the port varies with the position of the spool 306, which is controlled by the magnitude of the electrical current directed through the solenoid coil 316.

The electronic control unit 302 includes a module housing 303 containing structure such as at least one control processor 305 (e.g., at least one electronic microprocessor/microcontroller), memory 307 which can be accessed by the control processor 305, and a vibration sensor in the form of an accelerometer 309 (e.g., a three axis accelerometer). The control processor 305 can be adapted to execute computer-readable instructions stored on the memory 305 which allow the electronic control unit 302 to control the electrical current provided to the solenoid coil 316. The electronic control unit 302 can be integrated as part of a system which implements a communication protocol (e.g., a Controller Area Network bus (CAN bus)) for coordinating operation of a plurality of the electronic control units 302. The control unit 302 can be electrically connected by electrical wiring 313 (e.g., which may include an electrical harness) to a central controller 315. In this way, electrical power and supervisory control can be provided to the control unit 302. A control interface 317 (e.g., a joystick, dial, toggle, or other device for allowing an operator to input control commands to the central controller 315) connects to the central controller 315. The control unit 302 electrically connects to the solenoid coil 316 (e.g., via a 2-contact electrical connector) and is adapted to direct electrical current to the coil 316 to control operation of the valve 300. The control unit 302 is capable of varying the magnitude of the electrical current provided to the coil 316 in response to control commands input to the central controller 315 by the operator through the control interface 317.

The control unit 302 mounts at a location in which the accelerometer 309 can sense vibration of the valve 300. For example, the control unit 302 can mount to the solenoid 312 (e.g., to the solenoid housing) or elsewhere such as on the valve manifold (e.g., valve block). In one example, the control unit 302 is mechanically and electrically connected to the solenoid coil 316 by an electrical connector such as a two contact (e.g., 2-pin) connector that is received within a socket corresponding to the solenoid coil 316.

Figure 3:
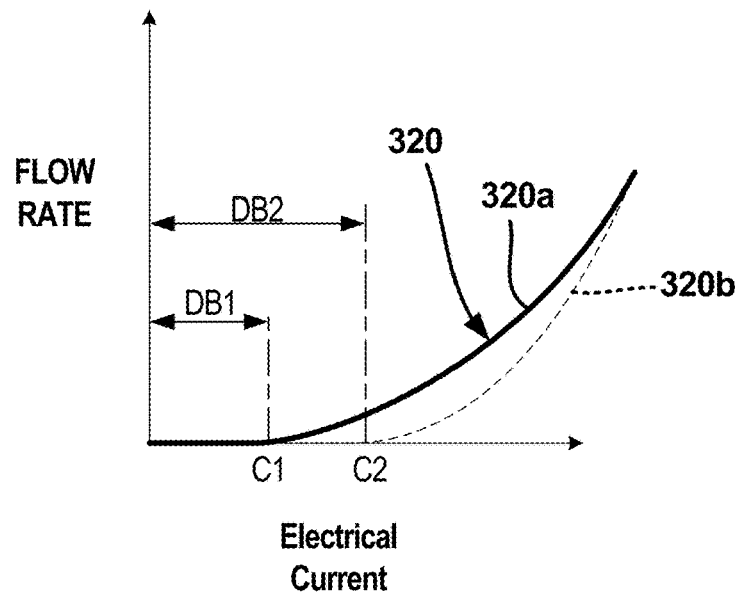
FIG. 3 is a graph depicting flow verses electrical current for the proportional valve of FIG. 2.

FIG. 3 is a graph showing an example flow rate profile 320 of the valve 300. Lines 320a, 320b represent the flow rate between two ports of the valve 300 at a predetermined pressure drop across the valve for the different axial positions of the spool 306. The axial position of the spool 306 is determined by the magnitude of the electrical current directed through the solenoid coil 316 by the control unit 302 based on the input command provided by an operator through the control interface 317. Line 320a represents the flow profile during opening of the valve flow passage between the ports, and line 320b represent the flow profile during closing of the valve flow passage between the ports. The lines 320a, 320b have different profiles due to hysteresis.

During opening of the valve flow passage, the line 320a defines a first dead band DB1 which, due to hysteresis, is shorter than a second dead band DB2 defined by the line 320b. The valve 300 begins to open at the end of the first dead band DB1 when the current reaches current level C1 and the valve closes at the end of the second dead band DB2 when the current reaches current level C2. Due to hysteresis, current level C2 is different from current level C1. In the example shown, current level C2 is larger than current level C1.

Figure 4:
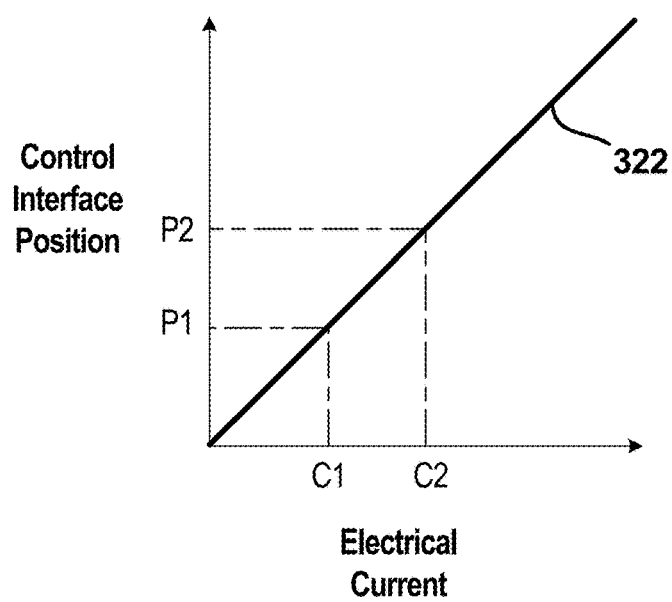
FIG. 4 is a graph depicting a conventional relationship between the position of a control interface (e.g., a joystick, dial, toggle, etc.) and the electrical current provided to the solenoid of a proportional valve.

FIG. 4 shows a conventional relationship between a control interface position (e.g., a joystick position) and the level of current provided to a solenoid coil of a proportional valve. As shown by line 322 at FIG. 4, the same current profile is used by the system during both opening and closing of the valve. Thus, the control interface is at a first position P1 (which corresponds to the first current C1) when the valve initially opens and is at a different second position P2 when the valve close. This variation in control interface position between valve opening and closing can compromise the operator "feel" of the system by making the system feel inconsistent and/or unpredictable.

To address this issue, certain aspects of the present disclosure relate to using different programmed current profiles to control opening and closing of the valve 300. For example, FIG. 5 depicts a first current profile 330a which defines the relationship between controller position and the electrical current provided to the solenoid coil 316 by the control unit 302 during opening of the valve 300 and also depicts a different second current profile 330b which defines the relationship between controller position and electrical current provided to the solenoid coil 316 by the control unit 302 during closing of the valve 300.

Figure 5:
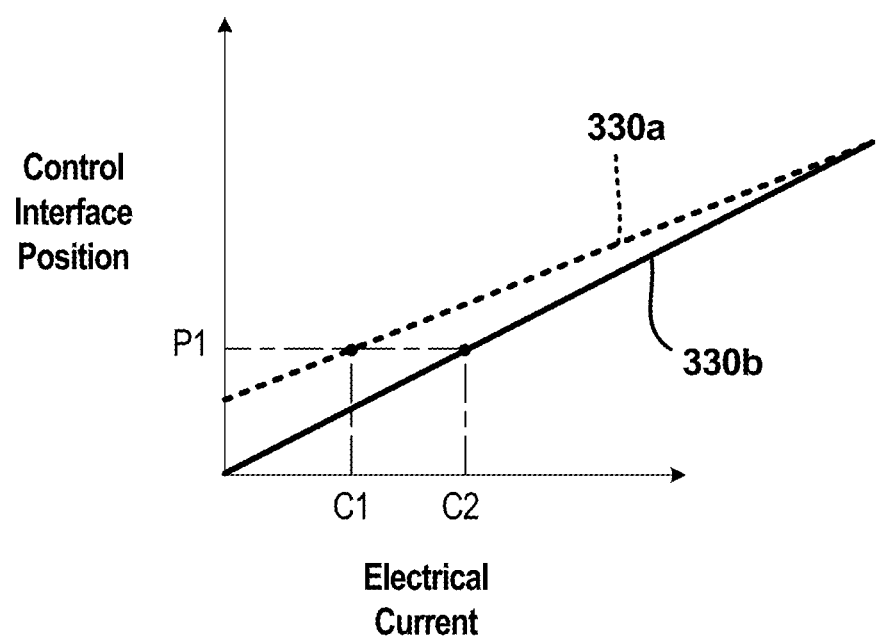
FIG. 5 is a graph depicting a programmed relationship in accordance with the principles of the present disclosure between the position of a control interface (e.g., a joystick, dial, toggle, etc.) and the electrical current provided to the solenoid of a proportional valve; the relationship uses electrical current generation programming which compensates for a difference in dead bands between valve opening and valve closing by implementing different electrical current generation profiles for opening and closing of the valve.

As shown at FIG. 5, the current profiles 330a, 330b are designed such that the current C1 where the valve 300 initially opens and the current C2 where the valve closes are provided at the same position P1 of the control interface 317. The current value C1 is determined by sensing the first vibration characteristic associated with opening of the valve 300 and identifying the electrical current being provided to the solenoid coil 316 by the control unit 302 at the time the first vibration characteristic is sensed. The current value C2 is determined by sensing the second vibration characteristic associated with closing of the valve 300 and identifying the electrical current being provided to the solenoid coil 316 by the control unit 302 at the time the second vibration characteristic is sensed. The electrical current values C1 and C2 can be stored in memory (e.g., memory 307).

The electrical current values C1 and C2 can be used to establish appropriate current profiles 330a, 330b for allowing the current value C1 to be provided to the solenoid 312 when the control interface 317 is in the position P1 during opening of the valve 300, and also allowing the current value C2 to be provided to the solenoid 312 when the control interface 317 is in the first position during closing of the valve 300. The system determines a direction of movement of the valve 300 (e.g., opening or closing) and applies the corresponding current profile 330a, 330b. For example, the system may determine the direction of movement based on the commands entered at the control interface 317, based on comparing current and recent positions of the control interface 317, or based on changes in current feedback. The first current profile 330a is applied when the valve 300 is opening and the second current profile 330b is applied when the valve 300 is closing.

It will be appreciated that the accelerometer 309 can be used to sense the first and second vibration characteristics and the control unit can identify the current values C1, C2 corresponding to the vibration characteristics. Based on this information, the control unit 302 can use an algorithm or look-up table to initially establish the current profiles 330a, 330b used by the system to define the relationship between controller position and electrical current during opening and closing of the valve 300. Thereafter, via the accelerometer 309, the control unit 302 can continuously sense and monitor the first and second vibration characteristics in real time. Each time a vibration characteristic has been sensed, the control unit 302 can compare the electrical current corresponding to the sensed vibration characteristic with the base-line electrical current stored in memory for the sensed vibration characteristic (e.g., C1 for the first vibration characteristic and C2 for the second vibration characteristic). The control unit 302 can use the real-time sensed vibration characteristics for valve diagnostics, failure prediction, and for modifying the current profiles 330a, 330b in real time. For example, if one or both of the sensed current values C1 and C2 deviate from the base-line current values C1 and C2 by a pre-determined threshold amount, the control unit 302 can initiate a controlled response. One example of a controlled response can include the issuance of an error indication. Another example of a controlled response can include adjusting the current profiles 300a, 300b to correspond to the newly sensed current values C1 and C2, and establishing the newly sensed current values C1 and C2 as new base-line values stored in memory.

Figure 6:
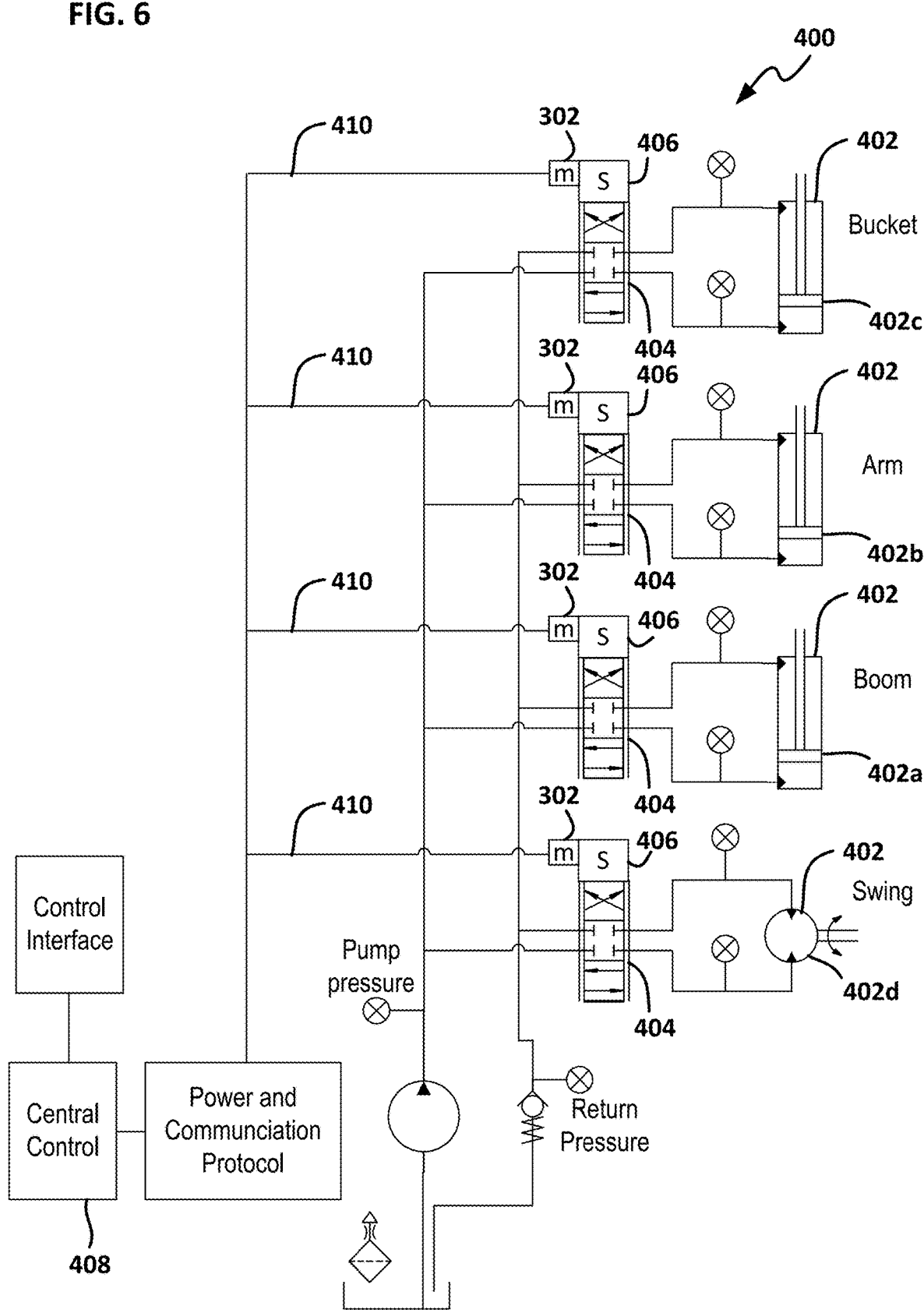
FIG. 6 is a schematic depiction of a hydraulic system for powering hydraulic actuators of an excavator.

FIG. 6 shows a hydraulic system 400 for an excavator which incorporates control units 302 in accordance with the principles of the present disclosure. The hydraulic system 400 includes hydraulic actuators 402 (e.g., hydraulic cylinders, hydraulic motors, etc.) distributed throughout the system. The actuators include hydraulic cylinders 402a-c for controlling movement of the boom, arm and bucket of the excavator, and a hydraulic motor 402d for controlling rotation of the excavator cab relative to the tracks. The hydraulic actuators 402 are controlled by valves 404 which are controlled by solenoids 406. The control units 302 are each assigned to a given one of the solenoids 406 and thus are distributed throughout the system to provide a distributed control system. The control units 302 are shown mounted to each solenoid 406, but could also be mounted to the valve blocks or elsewhere in relative close proximity to their assigned solenoid. A communication protocol (e.g., Ethernet, CAN bus) can be used as part of a network (e.g., with wired and optionally wireless communication capabilities) to coordinate operation of the control units 302 through a central control 408. Wiring can be used to provide power to the control units 302 and solenoids 406 and to allow for communication between the various electronic components of the system. The wiring can include wiring harnesses 410 that branch from a central cable or cables.

Figure 7:
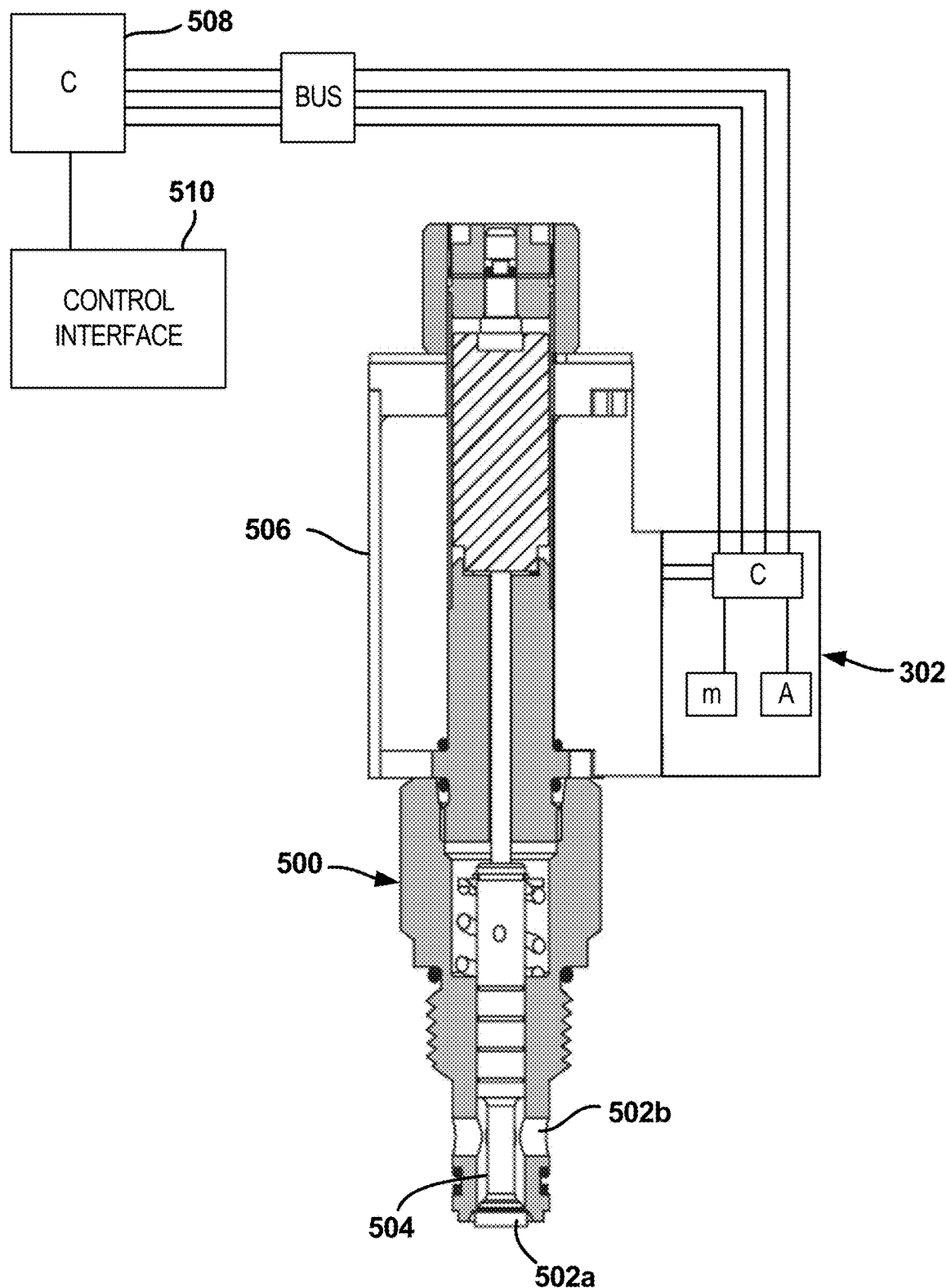
FIG. 7 depicts another proportional valve equipped with a control module in accordance with the principles of the present disclosure.

FIG. 7 shows one of the control units 302 coupled to a poppet-style proportional valve 500 which controls hydraulic fluid flow between first and second ports 502a, 502b. A poppet 504 of the valve 500 is moved by a solenoid 506. The control unit controls the electrical current provided to the solenoid 506 and senses first and second characteristic vibrations of the valve 500. Data associated with the sensed vibrations can be used in the same manner described above to generate modified current profiles and for error diagnosis. The control unit 302 interfaces with a central controller 508 and controls the current provided to the solenoid 506 based on operator commands received from a control interface 510.

EXAMPLE ASPECTS OF THE DISCLOSURE

Aspect 1. A spool valve assembly comprising:
a spool mounted within a spool bore of a valve housing, the spool being moveable between an open position where hydraulic fluid flow is permitted between first and second ports of the valve housing and a closed position where hydraulic fluid flow is blocked between the first and second ports, wherein a characteristic vibration is generated by turbulent hydraulic fluid flow within the spool valve assembly when hydraulic fluid flow is first initiated between the first and second ports as the spool moves from the closed position toward the open position;
a solenoid for moving the spool relative to the valve housing; and
a controller for providing electrical current to the solenoid to cause the solenoid to drive movement of the spool relative to the valve housing, the controller including an accelerometer for sensing the characteristic vibration, wherein the controller identifies an electrical current value of the electrical current at a time when the characteristic vibration is detected, and uses the identified electrical current value for determining a value of electrical current required to be supplied to the solenoid to move the spool from the closed position to the open position.

Aspect 2. The spool valve assembly of aspect 1,
wherein the identified electrical current value is a first identified value;
wherein the value of electrical current required is a first value of electrical current required;
wherein the characteristic vibration is a first characteristic vibration;
wherein a second characteristic vibration is generated by turbulent hydraulic fluid flow within the spool valve assembly when hydraulic fluid flow is about to be blocked between the first and second ports as the spool moves from the open position toward the closed position; and
wherein the controller is adapted to identify a second electrical current value of the electrical current at a time when the second characteristic vibration is detected by the accelerometer and uses the second identified electrical current value for determining a second value of electrical current required to be supplied to the solenoid to move the spool from the open position to the closed position.

Aspect 3. The spool valve assembly of aspect 2, wherein the first and second electrical current values are different from each other and the first and second electrical currents required are different from each other.

Aspect 4. The spool valve assembly of any preceding aspect, wherein the value of the first and/or the second electrical current required is/are stored in a memory and mapped to a command input via a command interface.

Aspect 5. The spool valve assembly of aspect 4, wherein the command interface is a joystick, and the command input corresponds to a programmed position of the joystick.

Aspect 6. The spool valve assembly of aspect 5, wherein the programmed position of the joystick is the same for the first and the second required electrical currents.

Aspect 7. The spool valve assembly of any preceding aspect, wherein the first and/or the second characteristic vibrations correspond to a highest vibration detected by the accelerometer while fluid flow between the first and second ports is being opened or blocked.

Aspect 8. The spool valve assembly of any preceding aspect, wherein the spool valve is a two-way spool valve.

Aspect 9. The spool valve assembly of any preceding aspect, wherein the spool valve is a three-way spool valve.

Aspect 10. A hydraulic system comprising:
a spool valve assembly according to any preceding claim;
and a hydraulic cylinder operatively coupled to a load, wherein the spool valve assembly controls fluid flow to the hydraulic cylinder.

Aspect 11. The system of aspect 10, wherein the system comprises one of: a crane, an excavator, and a loader.

Aspect 12. The system aspect 10 or 11, wherein the load is a rotary load.

Aspect 13. The system of any of aspects 1-12, wherein the accelerometer and controller cooperate to calculate position and/or motion of one or more components of the system.

Aspect 14. A method of identifying a value of electrical current required to open or block fluid flow between two ports of a valve housing of a valve assembly comprising:
  detecting, with an accelerometer, a characteristic vibration of the valve assembly after a fluid flow between the first and second ports opens or before a fluid flow between the first and second ports is blocked; and
  mapping the characteristic vibration to an electrical current being supplied to a solenoid of the valve assembly when the characteristic vibration was detected.

Aspect 15. A method for monitoring operation of a hydraulic valve, the method comprising:
  detecting when the valve has reached an open or closed position by sensing a characteristic vibration of the valve caused by turbulence in the valve.

Aspect 16. A method for determining when a hydraulic valve has reached an open position, the method comprising:
  sensing a characteristic vibration of the valve caused by turbulence in the valve as the valve opens.

Aspect 17. A method for determining when a hydraulic valve has reached a closed position, the method comprising:
  sensing a characteristic vibration of the valve caused by turbulence in the valve as the valve closes.

Aspect 18. A valve assembly comprising:
  a valve moveable between open and closed positions, the valve having a characteristic vibrations caused by turbulence that occurs during opening and closing of the valve;
  a controller that controls opening and closing of the valve, the controller including an accelerometer adapted to sense the characteristic vibrations.

Aspect 19. The valve assembly of aspect 18, wherein the controller provides electrical current to a solenoid for moving the valve between the open and closed positions, and wherein the controller identifies electrical currents provided to the solenoid at the time the characteristic vibrations are detected.

Aspect 20. The valve assembly of aspects 18 or 19, wherein the controller stores the identified electrical currents in memory and uses the stored electrical currents for diagnostic purposes.

Aspect 21. A valve assembly comprising:
  a valve moveable between an open position and a closed position;
  a solenoid for opening and closing the valve, wherein the valve opens when a first current is provided to the solenoid and the valve closes when a second electrical current is provided to the solenoid, the first and second electrical currents having different values;
  a controller for providing the electrical current to the solenoid, wherein the controller provides electrical current to the solenoid in response to control commands from a user interface, and wherein a relationship between a position of the user interface and the electrical current provided to the solenoid varies based on whether the valve is being opened or closed.

Aspect 22. The valve assembly of aspect 21, wherein the relationship between the position of the user interface and the electrical current provided to the solenoid is designed such that the controller provides the first electrical current to the solenoid when the user interface is in the first position during opening of the valve, and provides the second electrical current to the solenoid when the user interface is in the first position during closing of the valve.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A valve assembly, comprising:
  a valve moveable between an open position where hydraulic fluid flow is permitted between first and second ports of the valve and a closed position where hydraulic fluid flow is blocked between the first and second ports, wherein a first characteristic vibration is generated by turbulent hydraulic fluid flow within the valve when hydraulic fluid flow is first initiated between the first and second ports as the valve moves from the closed position toward the open position; and
  a controller that controls opening and closing of the valve, the controller including an accelerometer adapted to sense the first characteristic vibration, the controller being configured to identify a first electrical current value associated with the first characteristic vibration, wherein the first electrical current value is stored in a memory as a base-line current value corresponding to a command input.

2. The valve assembly of claim 1,
  wherein a second characteristic vibration is generated by turbulent hydraulic fluid flow within the valve when hydraulic fluid flow is about to be blocked between the first and second ports as the valve moves from the open position toward the closed position; and
  wherein the accelerometer is adapted to sense the second characteristic vibration.

3. The valve assembly of claim 1, further comprising:
  a solenoid for moving the valve between the open and closed positions;
  wherein the controller is adapted to provide electrical current to the solenoid; and
  wherein the controller identifies the first electrical current value of the electrical current provided to the solenoid at a first time when the first characteristic vibration is detected.

4. The valve assembly of claim 3, wherein the command input is provided at a command interface.

5. The valve assembly of claim 4, wherein the command interface is a joystick.

6. The valve assembly of claim 4,
  wherein the controller identifies a second electrical current value of the electrical current provided to the solenoid at a second time when the first characteristic vibration is detected, the second current value being different from the first current value such that there is a deviation between the first current value and the second current value; and
  wherein the controller is configured to initiate a response based on the deviation.

7. The valve assembly of claim 6, wherein the response is an error indication.

8. The valve assembly of claim 6, wherein the response is an adjustment of a current profile.

9. The valve assembly of claim 6, wherein the response is initiated when the deviation exceeds a pre-determined threshold deviation.

10. The valve assembly of claim 3, wherein the controller is a control module that mounts to the solenoid.

11. The valve assembly of claim 1, wherein the valve is a spool valve.

12. The valve assembly of claim 1, wherein the valve is a poppet valve.

13. The valve assembly of claim 1, wherein the controller is a control module that mounts to a valve manifold in which the valve is mounted.

14. The valve assembly of claim 1, wherein the valve assembly is used to control a hydraulic actuator of an off-highway vehicle.

15. A method for determining when a hydraulic valve has reached an open position, the valve being moveable between the open position where hydraulic fluid flow is permitted between first and second ports of the valve and a closed position where hydraulic fluid flow is blocked between the first and second ports, the method comprising:

sensing, at a first time, a first characteristic vibration of the valve caused by turbulence in the valve when hydraulic fluid flow is first initiated between the first and second ports as the valve moves from the closed position toward the open position;

mapping the sensed first characteristic vibration to a first value of an electrical current being supplied to an actuator of the valve; and storing the mapped first value.

16. The method of claim 15, wherein the sensing is performed by an accelerometer.

17. The method of claim 15, further comprising:

sensing a second characteristic vibration of the valve caused by turbulence in the valve when hydraulic fluid flow is about to be blocked between the first and second ports as the valve moves from the open position toward the closed position;

mapping the sensed second characteristic vibration to a second value of an electrical current being supplied to an actuator of the valve; and storing the mapped second value.

18. The method of claim 15, further comprising:

identifying a second value of an electrical current being supplied to the actuator of the valve when the first characteristic vibration is sensed at a second time;

identifying a deviation between the first current value and the second current value; and initiating a response based on the deviation.

19. The method of claim 18, wherein the response is an error indication.

20. The method of claim 18, wherein the initiating a response occurs when the deviation exceeds a pre-determined threshold deviation.

* * * * *